(12) United States Patent
Higuchi

(10) Patent No.: US 6,882,830 B2
(45) Date of Patent: Apr. 19, 2005

(54) MULTI-BAND RADIO TERMINAL APPARATUS

(75) Inventor: Kazutoshi Higuchi, Ibaraki-ken (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/435,557

(22) Filed: May 12, 2003

(65) Prior Publication Data

US 2003/0199261 A1 Oct. 23, 2003

Related U.S. Application Data

(63) Continuation of application No. 10/094,710, filed on Mar. 12, 2002, now Pat. No. 6,587,673, which is a continuation of application No. 09/261,179, filed on Mar. 3, 1999, now Pat. No. 6,438,358.

(30) Foreign Application Priority Data

Mar. 4, 1998 (JP) ............................................ 10-052309

(51) Int. Cl.[7] .................................................. H04B 1/40
(52) U.S. Cl. ........................ 455/84; 455/86; 455/552.1
(58) Field of Search .......................... 455/552.1, 553.1, 455/84, 86, 131, 74, 76, 77

(56) References Cited

U.S. PATENT DOCUMENTS

| 5,794,159 A | 8/1998 | Portin ......................... 455/553 |
| 5,852,784 A | 12/1998 | Ito et al. ...................... 455/552 |
| 6,014,571 A | 1/2000 | Enoki .......................... 455/550 |
| 6,029,052 A | 2/2000 | Isberg et al. ................. 455/131 |
| 6,175,746 B1 | 1/2001 | Nakayama et al. .......... 455/552 |
| 6,256,511 B1 * | 7/2001 | Brown et al. ............. 455/552.1 |
| 6,438,358 B1 | 8/2002 | Higuchi ....................... 455/84 |
| 6,587,673 B1 * | 7/2003 | Higuchi ....................... 455/84 |

* cited by examiner

*Primary Examiner*—Erika A. Gary
(74) *Attorney, Agent, or Firm*—Antonelli, Terry, Stout & Kraus, LLP

(57) ABSTRACT

In a multi-band radio terminal apparatus, when communication frequency bands are switched, a reception intermediate frequency is selected to be equal to each other in respective communication frequency bands. As a result, the circuit arrangements of this multi-band radio terminal apparatus succeeding to the intermediate frequency signal circuit stage are commonly used in the respective communication frequency bands. While a local oscillator signal is produced by a voltage-controlled oscillator, a phase-locked loop, and a doubler, in a case where communication is established within a plurality of communication frequency bands, the transmission/reception frequency intervals are different from each other. A mixer for a reception system and a mixer for a transmission system are commonly used so as to convert the frequency of the local oscillator signal into a frequency existing between the communication frequency and the intermediate frequency.

3 Claims, 3 Drawing Sheets

MULTI-BAND RADIO TERMINAL APPARATUS

The present application is a continuation of application Ser. No. 10/094,710, filed Mar. 12, 2002, now U.S. Pat. No. 6,587,673, which is a continuation of application Ser. No. 09/261,179, filed Mar. 3, 1999, now U.S. Pat. No. 6,438,358, the contents of which are incorporated herein by reference.

BACKGROUND OF THE INVENTION

The present invention is related to a multi-band radio (wireless) terminal apparatus capable of performing radio communications over a plurality of communication frequencies, and more specifically, to a technique suitable in a portable telephone apparatus.

As the communication system available in U.S.A., there is such a communication system that a single CDMA (Code Division Multiple Access) communication method is applied to different communication frequency bands (800 MHz band and 1.9 GHz band). In such a commutation system, if a radio terminal apparatus is operable in both the communication frequency bands, then this radio terminal apparatus becomes very convenient for users.

Generally speaking, this sort of radio terminal apparatus employs the superheterodyne system. This superheterodyne system is applied to each of communication frequency bands so as to switch an intermediate frequency (IF).

In a CDMA type radio terminal apparatus designed for U.S.A. and operable in both communication frequency bands of 800 MHz and 1.9 GHz, a first local oscillator is commonly used in a signal transmission system and also in a signal reception system so as to frequency-convert a radio signal between a radio communication frequency and an intermediate frequency. In this case, the reception frequency is selected to be higher than the transmission frequency by 45 MHz in the 800 MHz band, whereas the reception frequency is selected to be higher than the transmission frequency by 80 MHz. As a result, in the signal transmission system, 130.38 MHz can be commonly used in both the 800 MHz band and the 1.9 GHz as the intermediate frequency. However, in the signal reception system, two sets of intermediate frequencies are provided. That is, the intermediate frequency of 85.38 MHz is provided for the 800 MHz band, whereas the intermediate frequency of 210.38 MHz is provided for the 1.9 GHz band.

As a consequence, two sets of the reception-sided (RX) intermediate frequency (IF) band-pass filters for the 800 MHz band and the 1.9 GHz band are required as to RX IF band-pass filters. Thus, these RX IF band-pass filters for the 800 MHz/1.9 GHz bands must be selectively operated. In general, these RX IF band-pass filters are required to have the steep filtering characteristics. To this end, since SAW (Surface Acoustic Wave) filters are employed as the RX IF band-pass filters, the employment of these SAW filters would increase the manufacturing cost of this sort of radio terminal apparatus.

SUMMARY OF THE INVENTION

The present invention has been made to solve the above-described cost-up problem, and therefore, has an object to provide such a multi-band radio terminal apparatus capable of transmitting/receiving signals in a plurality of radio communication frequency bands, in which reception intermediate frequencies for the respective communication frequency bands are made equal to each other. As a consequence, circuit arrangements provided subsequent to a reception intermediate frequency circuit stage can be commonly used for both the signal transmission/reception systems, and also can be made simple.

To achieve the above-describe object, a multi-band radio terminal apparatus, according to a first aspect of the present invention, is featured by such a multi-band radio terminal apparatus comprising: transmitting/receiving means for processing radio communication signals of a plurality of communication frequency bands, the radio communication signals being used to communicate with a base station; first frequency converting means for frequency-converting the frequency bands of the radio communication signals between the communication frequency bands and an intermediate frequency band; and second frequency converting means for converting the radio communication signals between base-band signals and an intermediate frequency signal; wherein: the first frequency converting means includes: one reception-sided mixer for converting a reception signal within the communication frequency band in to another reception signal within the intermediate frequency band; one transmission-sided mixer for converting a transmission signal within the intermediate frequency band into another transmission signal within the communication frequency band; and a first single local oscillator for commonly supplying a local oscillator signal to both the reception-sided mixer and the transmission-sided mixer; and the first local oscillator includes: switching means for commonly supplying an oscillator output of an oscillator to both the reception-sided mixer and the transmission-sided mixer while maintaining a frequency of the oscillator output, or for either doubling or frequency-dividing the frequency of the oscillator output to commonly supply the oscillator output having either the doubled frequency or the frequency-divided frequency to both the reception-sided mixer and the transmission-sided mixer in response to the frequency band of the radio signal used in the communication between the base station and the multi-band radio terminal apparatus.

Furthermore, a multi-band radio terminal apparatus, according to a second aspect of the present invention, is featured by such a multi-band radio terminal apparatus comprising: transmitting/receiving means for processing radio communication signals of a plurality of communication frequency bands, the radio communication signals being used to communicate with a base station; first frequency converting means for frequency-converting the frequency bands of the radio communication signals between the communication frequency bands and an intermediate frequency band; and second frequency converting means for converting the radio communication signals between base-band signals and an intermediate frequency signal; wherein: the first frequency converting means includes: one reception-sided mixer for converting a reception signal within the communication frequency band into another reception signal within the intermediate frequency band; one transmission-sided mixer for converting a transmission signal within the intermediate frequency band into another transmission signal within the communication frequency band; and a first single local oscillator for commonly supplying a local oscillator signal to both the reception-sided mixer and the transmission-sided mixer; and the second frequency converting means includes: a second local oscillator for producing a second local oscillator signal having a frequency which is varied in response to the frequency band of the radio signal used in the communication between the base station and the multi-band radio terminal apparatus; and a mixer for using the second local oscillator signal so as to convert a transmission base-band signal into a transmission intermediate frequency signal.

DESCRIPTION OF THE PREFERRED EMBODIMENTS

Referring now to drawings, various embodiments of a multi-band radio terminal apparatus according to the present invention will be described.

Figure 1:
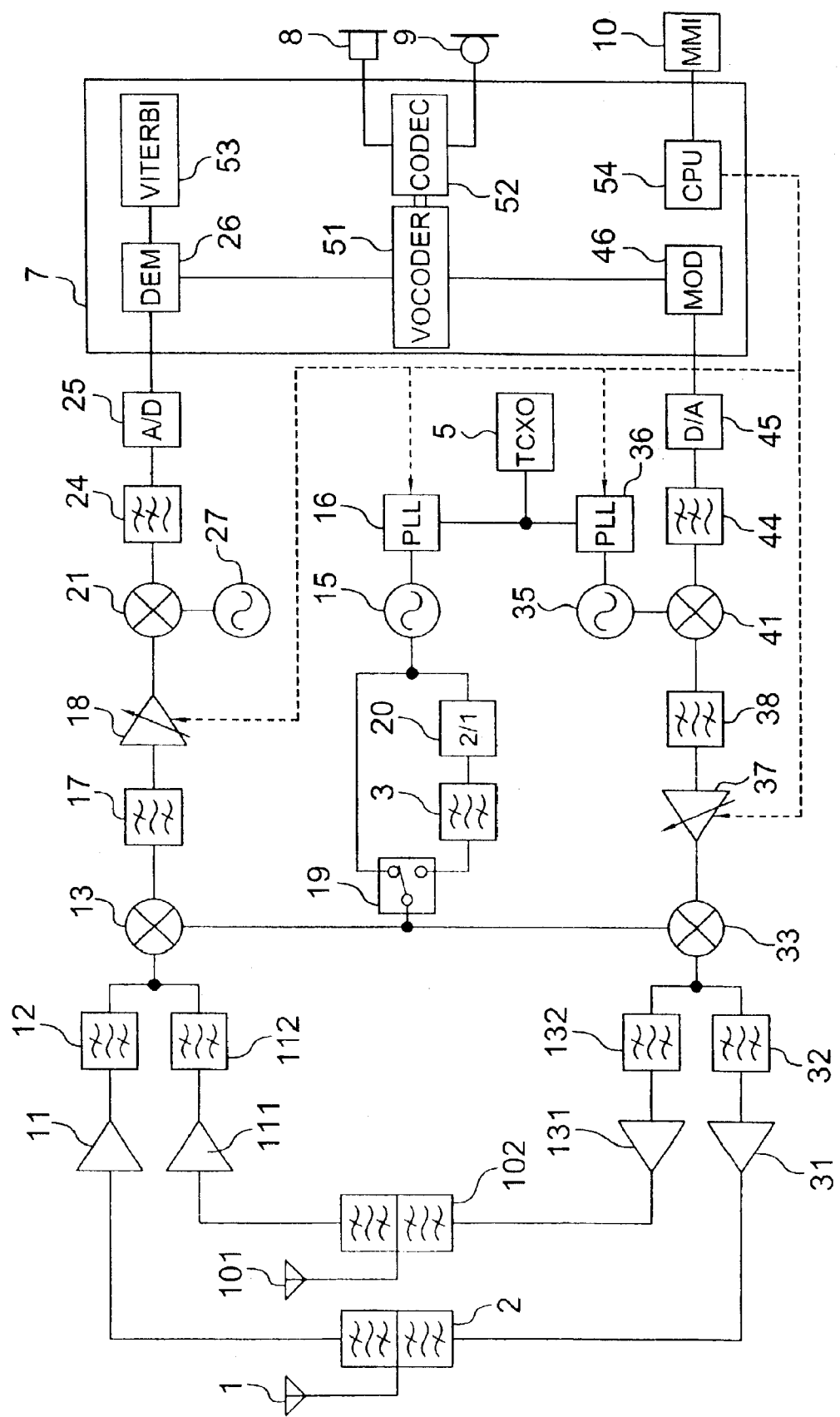
FIG. 1 is a schematic block diagram for representing an arrangement of a multi-band radio terminal apparatus according to a first embodiment of the present invention.

FIG. 1 is a schematic block diagram for indicating an arrangement of a multi-band radio terminal apparatus according to a first embodiment of the present invention.

This first embodiment corresponds to a CDMA type radio (wireless) terminal apparatus designed for U.S.A. This CDMA type radio terminal apparatus uses an 800 MHz band (TIA/EIA1S-95-A, namely 800 MHz-band cellular system) as the first frequency band, and a 1.9 GHz band (ANSI J-STD-008, 1.9 GHz-band PCS system) as the second frequency band.

First, operations of this multi-band radio terminal apparatus in the first frequency band (800 MHz) will be described. In a signal reception system, a radio (wireless) communication signal transmitted from a base station (not shown) is received by a first frequency band antenna 1, and then a signal within a reception frequency (all channels) band is derived from a first frequency band duplexer 2. The reception frequency band of the reception signal within the first frequency band, derived from the first frequency band duplexer 2, is selected from 869.01 MHz to 894 MHz. Furthermore, the reception signal is amplified by a first frequency band low-noise amplifier 11, and an unnecessary signal component is removed from the amplified reception signal by a first frequency band RX band-pass filter 12. The resultant reception signal is converted into a reception intermediate frequency signal (210.38 MHz) by a first frequency band RX mixer 13.

The signal band of this reception intermediate frequency signal is limited to 1.25 MHz by using an RX IF band-pass filter 17, and thereafter the limited reception-IF signal is amplified by an RX variable gain amplifier 18 so as to obtain a necessary signal level there of in the post-staged circuit. Then, the amplified IF signal is 4-phase-demodulated by an RX second mixer 21 of a base-band analog signal processing circuit 7. Moreover, the frequency band of this reception base-band signal is limited by an RX low-pass filter 24, and then the band-limited reception base-band signal is converted into a reception digital signal by an analog-to-digital converter 25. This digital signal is entered into a CDMA demodulator 26 of a base-band digital signal processing circuit 7 provided at a post stage of the A/D converter 25.

The CDMA demodulator 26 demodulates such a reception digital signal which has been processed by way of the convolution coding, the block interleaving, the 64-order quadrature modulating, and the direct sequence spreading. To decode the convolution code, a Viterbi decoder 53 is employed. Also, a signal which is decoded when the reception digital signal is demodulated by the CDMA demodulator 26 is constituted by a control signal and a reception voice (speech) signal. This reception voice signal is processed by a vocoder 51 so as to decode a high-efficiency voice code, and a PCM code is decoded by a codec 52 in order to be outputted as a voice signal from a receiver 8. It should be noted that the control signal is supplied to a controller 54, and this controller 54 discriminates the control signal to execute various sorts of control operations of the radio terminal apparatus.

In a transmission signal systems, transmission voice is picked up by a microphone 9, the voice signal is PCM-coded by the codes 52, and then the PCM-coded voice signal is processed by the vocoder 51 by way of the high efficiency speech coding to produce a transmission voice signal. This transmission voice signal and the control signal produced by the controller 54 are processed by the CDMA modulator 46 by way of the convolution coding, the block interleaving, the 64-order quadrature modulating, and the direct sequence spreading, so that a transmission digital signal. Then, this transmission digital signal is supplied to a TX digital-to-analog converter 45 of a base-band analog signal processing circuit 6 provided at the next stage of the CDMA modulator 46.

The TX D/A converter 45 D/A-converts this transmission digital signal into a transmission base-band signal, and then the bandwidth of this transmission base-band signal is limited by a TX low-pass filter 44. Furthermore, this transmission base-band signal is 4-phase-modulated by a TX second mixer 41 so as to be converted into a TX intermediate frequency signal (255.38 MHz). The bandwidth of this TX intermediate frequency signal is limited to 1.25 MHz by a TX IF band-pass filter 38. The band-limited TX IF signal is amplified by a TX variable amplifier 37 provided at a post stage to a necessary signal level thereof.

This transmission IF signal is converted into a transmission signal by a first frequency band TX mixer 33, an unnecessary signal component is removed from this transmission IF signal by a first frequency band TX band-pass filter 32, and then the resultant transmission signal is amplified by a first frequency band power amplifier 31. In this case, the transmission frequency band of the first frequency transmission signal is selected to be 824.01 MHz to 849 MHz. Furthermore, signals outside the transmission frequency (all channels) band are removed by the first frequency duplexer 2, and then a radio (wireless) communication signal is radiated from the first frequency band antenna 1.

Next, operations of this multi-band radio terminal apparatus in the second frequency band (1.9 GHz) will be described.

In a signal reception system, a radio (wireless) communication signal transmitted from a base station (not shown) is received by a second frequency band antenna 101, and then a signal within a reception frequency (all channels) band is derived from a second frequency band duplexer 102. The reception frequency band of the reception signal within the second frequency band, derived from the second frequency band duplexer 102, is selected from 1930 MHz to 1990 MHz. Further more, the reception signal is amplified by a second frequency band low-noise amplifier 111, and an unnecessary signal component is removed from the amplified reception signal by a second frequency band RX band-pass filter 112. The resultant reception signal is converted into a reception intermediate frequency signal (210.38 MHz) by a second frequency band RX mixer 113. The subsequent signal process operations are similar to those of the first communication frequency band.

In a signal transmission system, signal process operations capable of deriving a transmission intermediate signal (290.38 MHz) in this second frequency band are similar to those of the first frequency band. However, this transmission intermediate frequency of the second frequency band is different from that of the first frequency band. This transmission IF signal is converted into a transmission signal by the first frequency band TX mixer 33, an unnecessary signal component of this transmission IF signal is removed by a second frequency band TX band-pass filter 132, and then the resultant transmission signal is amplified by a second frequency band power amplifier 131. In this case, the transmission frequency band of the second frequency transmission signal is selected to be 1850 MHz to 1910 MHz. Furthermore, signals outside the transmission frequency (all channels) band are removed by the second frequency duplexer 102, and then a radio (wireless) communication signal is radiated from the second frequency band antenna 101.

In the controller 54, a microcomputer is provided as a main control unit. As indicated by a dotted line of FIG. 1, this controller 54 controls the gain of the RX variable gain amplifier 18 in order that a frequency of a phase-locked loop (PLL) is properly set, and also a level of a reception signal becomes a proper level. The controller 54 controls the gain of the TX variable gain amplifier 37 in order that a level of a transmissions signal becomes a proper level. Also, this controller 54 performs control operations of the respective circuit units.

On the other hand, the controller 54 is connected to a man-to-machine interface 10 constituted of a sounder, a liquid crystal display (LCD) device, and a keypad so as to execute a calling process operation when a telephone call is received, and a dialing process operation when a telephone call is issued. The major flow operations of the transmission signal and the reception signal are described as in the above descriptions. Now a description will be made of frequency converting unit according to the feature of the present invention.

As a local oscillator (LO) system, there are provided a first frequency converting system, and a second frequency converting system. The first frequency converting system converts a radio frequency signal into an intermediate frequency signal, and/or converts an intermediate frequency signal into a radio frequency signal. The second frequency converting system 4-phase-modulates/demodulates both an intermediate frequency signal and a base-band signal. A local oscillator used in the respective frequency converting operations is arranged by a voltage-controlled oscillator and a PLL (phase-locked loop). It should be understood in this embodiment that as to the respective intermediate frequencies for the reception system and the transmission system, the RX (reception side) intermediate frequency is commonly set to 210.38 MHz in both the communication frequency bands, whereas the TX (transmission side) intermediate frequencies are set to 255.38 MHz (first communication frequency band) and 290.38 MHz (second communication frequency band).

In FIG. 1, the first frequency converting system is constituted by the first frequency band RX mixer 13, the first frequency TX mixer 33, the first voltage-controlled oscillator 15, the first phase-locked loop 16, an LO doubler 20, an LO band-pass filter 3, and a first local oscillator switch 19. Then, the second frequency converting system is arranged by the second frequency band RX mixer 21, the second RX local oscillator 27, the second frequency band TX mixer 41, the second voltage-controlled oscillator 35, and the second phase-locked loop 36. Both the first phase-locked loop and the second phase-locked loop are arranged in such a manner that a temperature-compensated crystal oscillator 5 is employed as a reference oscillator source, and a local oscillator frequency is controlled by the controller 54.

First of all, in the first frequency converting system, the activated circuits are changed by such a condition that this radio terminal apparatus is operated in any of the communication frequency bands.

In the case that the radio terminal apparatus is operated in the first communication frequency band, the first local oscillator switch 19 is switched to the output side of the first voltage-controlled oscillator 15, and a first local oscillator is constituted by the first voltage-controlled oscillator 15 and the first phase-locked loop 16 so as to output a first local oscillator signal.

On the signal reception side, the first frequency band RX mixer 13 uses the above-explained first local oscillator signal in order to convert the reception signal (869.01 MHz to 894 MHz) into the reception intermediate frequency signal (210.38 MHz). In this case, as the first local oscillator signal, any one of an upper side wave and a lower side wave may be selected. In this first embodiment, as the upper side wave, the frequency thereof is selected to be 1079.39 MHz to 1104.38 MHz.

Also, on the signal transmission side, the first frequency band TX mixer 33 uses the same first local oscillator signal (1079.39 MHz to 1104.38 MHz) so as to convert the transmission intermediate frequency (255.38 MHz) into the transmission signal (824.01 MHz to 849 MHz). In an actual case, since the transmission frequency is determined, the transmission intermediate frequency may be determined based upon both this transmission frequency and the first local oscillator frequency.

In the case that the radio terminal apparatus is operated in the second communication frequency band, the first local oscillator switch 19 is switched to the output side of the LO band-pass filter 3, and a first local oscillator is constituted by the first voltage-controlled oscillator 15 and the local oscillator frequency thereof is doubled by the LO doubler 20. Then, an unnecessary signal wave of the doubled local oscillator signal is removed by the local oscillator band-pass filter 3 so as to output as the first local oscillator signal.

On the signal reception side, the first frequency band RX mixer 13 uses the above-explained first local oscillator signal in order to convert the reception signal (1930 MHz to 1990 MHz) into the reception intermediate frequency signal (210.38 MHz). In this case, as the first local oscillator signal, any one of an upper side wave and a lower side wave may also be selected. In this first embodiment, as the upper side wave, the frequency thereof is selected to be 2140.38 MHz to 2200.38 MHz. As a result, an oscillator frequency of an oscillator (namely, first voltage-controlled oscillator 15 and first phase-locked loop 16) is equal to a half of the above-described frequency, namely 1070.19 MHz to 1100.19 MHz.

Also, on the signal transmission side, the first frequency band TX mixer 33 uses the same first local oscillator signal (2140.38 MHz to 2200.38 MHz) so as to convert the transmission intermediate frequency (290.38 MHz) into the transmission signal (1850 MHz to 1910 MHz). In an actual case, since the transmission frequency is determined, the transmission intermediate frequency may be determined based upon both this transmission frequency and the first local oscillator frequency.

As a consequence, both the first voltage-controlled oscillator 15 and the first phase-locked loop 16 may cover the oscillator frequency range defined from 1070.19 MHz to 1104.38 MHz.

Next, a description will now be made of the second frequency converting system. In this second frequency converting system, the same means of the radio terminal apparatus may function in any of such cases that this radio terminal apparatus is operated in the first communication frequency band, and also in the second communication frequency band.

On the reception side (RX), the frequency of the reception intermediate signal when the radio terminal apparatus is operated in the first communication frequency band is identical to that when the radio terminal apparatus is operated in the second communication frequency band. As a result, a local oscillator signal having a frequency of 210.38 MHz is produced by the second RX local oscillator 27, and this local oscillator signal is supplied to the second RX frequency mixer 21 for the 4-phase modulation purpose.

On the transmission side (TX), the frequency of the transmission intermediate signal when the radio terminal apparatus is operated in the first communication frequency band is different from that when the radio terminal apparatus is operated in the second communication frequency band. As a result, since a second TX local oscillator is arranged by the second voltage-controlled oscillator 35 and the second phase-locked loop 36, when the radio terminal apparatus is operated in the first communication frequency band, such a local oscillator signal having a frequency of 255.38 MHz is produced, whereas when the radio terminal apparatus is operated in the second communication band, such a local oscillator signal having a frequency of 290.38 MHz is produced. These local oscillator signals are supplied to the second TX frequency mixer 41.

As a consequence, the local oscillator arranged by employing the second voltage-controlled oscillator 35 and the second phase-locked loop 36 may be operated by switching the oscillator frequencies between 255.38 MHz and 290.38 MHz.

Also, the pass bands of the TX intermediate frequency band-pass filter 38 are selected to be 255.38 MHz and 290.38 MHz. Since this band-pass filter 38 merely can pass the frequency of the TX IF signal and can have a sufficiently large attenuation amount as to the frequency of the RX IF signal, this band-pass filter 38 may be replaced by a high-pass filter having a simple structure.

As previously described, in accordance with the first embodiment, the first frequency converting system for converting the radio frequency into the intermediate frequency may be realized by employing such a relatively simpler circuit arrangement that a single local oscillator is commonly used in the two communication frequency bands, and also both the mixers 13 and 33 are commonly used. This single local oscillator is constituted by the voltage-controlled oscillator 15 controlled by the phase-locked loop 16, the frequency doubler 20, the local oscillator band-pass filter 3, and also one local oscillator switch 19. Moreover, since this local oscillator 10 frequency is different from the communication frequency, there is no risk that the local oscillating operation is brought into unstable condition due to mutual interference.

Figure 2:
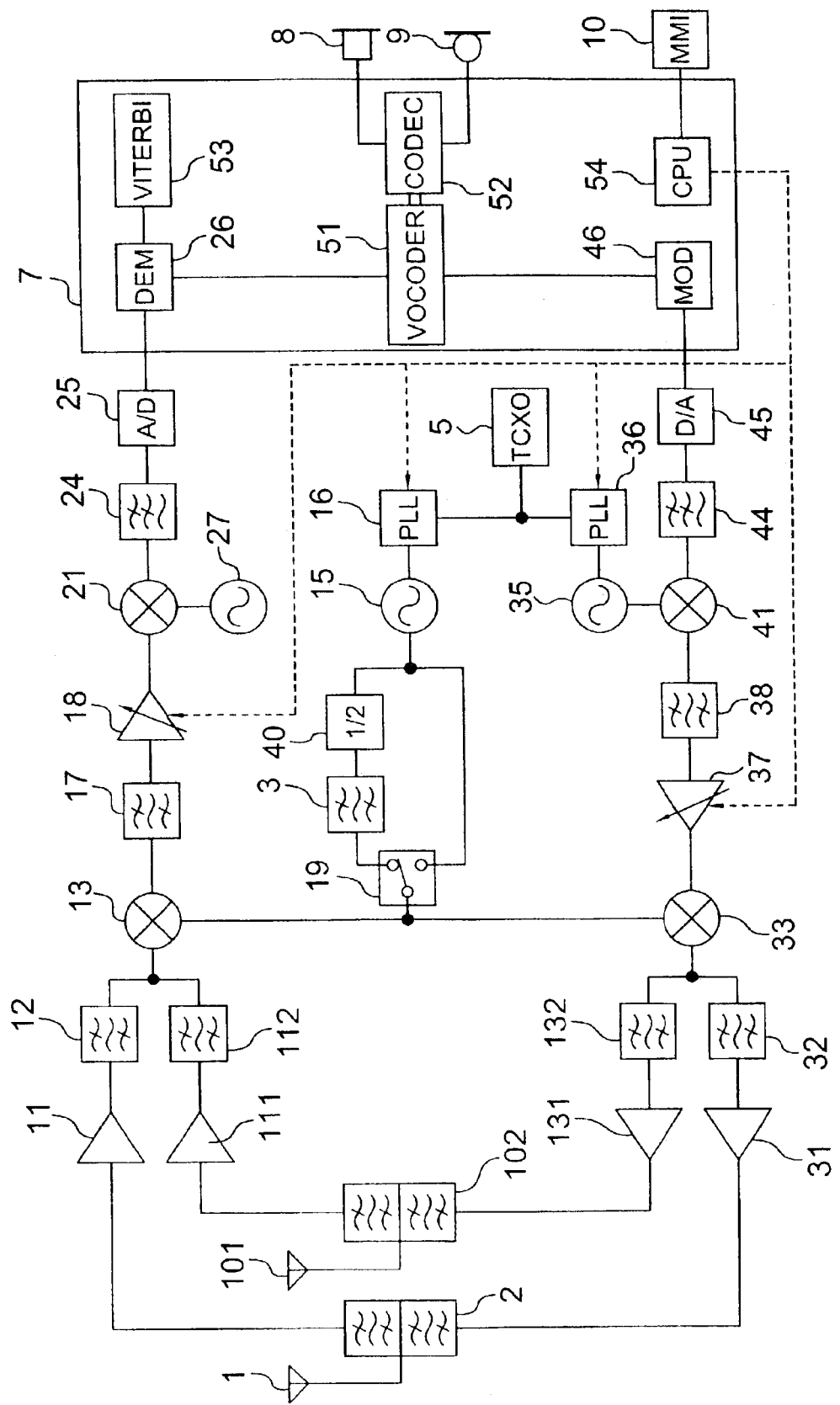
FIG. 2 is a schematic block diagram for representing an arrangement of a multi-band radio terminal apparatus according to a second embodiment of the present invention.

FIG. 2 is a schematic block diagram for showing an arrangement of a multi-band radio (wireless) terminal apparatus according to a second embodiment of the present invention.

The basic arrangement of this second embodiment is the same as that of the first embodiment, but this second embodiment owns a different structure of a first frequency converting system.

That is, the first frequency converting system employed in the second embodiment is constructed as follows. When the multi-band radio terminal apparatus of the second embodiment is operated in a first communication frequency band, a first local oscillator switch 19 is switched to an output side of a local oscillator band-pass filter 3, and a first local oscillator is arranged by a first voltage-controlled oscillator 15 and a first phase-locked loop 16. The local oscillating frequency of this first local oscillator is frequency-divided by a local oscillator frequency divider 40, and then an unnecessary signal wave of the divided local oscillator signal is removed by a local oscillator band-pass filter 3, so that the resultant local oscillator signal is outputted as a first local oscillator signal.

Also, when the multi-band radio terminal apparatus of the second embodiment is operated in a second communication frequency band, the first local oscillator switch 19 is switched to an oscillator output side of the first voltage-controlled oscillator 15, and a first local oscillator signal is outputted from the first local oscillator which is constructed by the first voltage-controlled oscillator 15 and the first phase-locked loop 16.

As a result, both the first voltage-controlled oscillator 15 and the first phase-locked loop 16 may cover such an oscillating frequency range defined from 2140.38 MHz to 2208.76 MHz.

In accordance with the second embodiment, since the frequency doubler 20 employed in the first embodiment is merely replaced by the frequency divider 40, a similar effect as in the first embodiment can be achieved.

Figure 3:
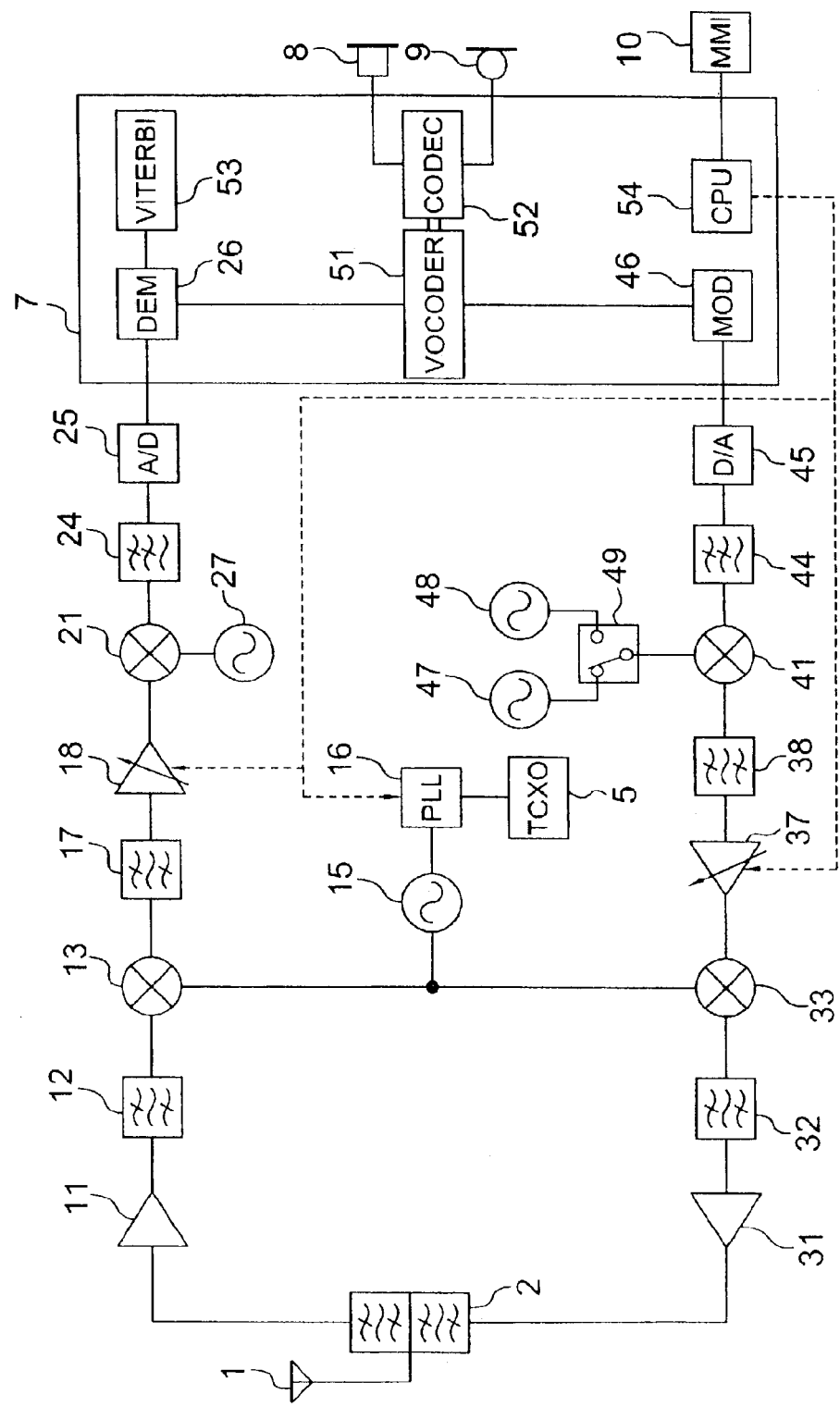
FIG. 3 is a schematic block diagram for representing an arrangement of a multi-band radio terminal apparatus according to a third embodiment of the present invention.

FIG. 3 is a schematic block diagram for representing an arrangement of a multi-band radio terminal apparatus according to a third embodiment of the present invention.

This third embodiment corresponds to a CDMA type multi-band radio terminal apparatus which uses the U.S. 800 MHz band (TIA/EIA IS-95-A, namely 800 MHz band cellular system) as a first communication frequency band, and also uses the Japanese 800 MHz band (ARIB STDT53, namely CDMA automobile portable telephone system) as a second communication frequency band.

This third embodiment owns features as follows. That is, although the frequency allocations are different, the multi-band radio terminal apparatus may be commonly operated as the CDNA type multi-band radio terminal apparatus. Accordingly, the operations of this multi-band radio terminal apparatus in any of the first and second communication frequency bands are similar to those of the first embodiment.

In this third embodiment, since the frequency of the first communication frequency band approximates to the frequency of the second communication frequency band, a high frequency front-end unit may be commonly employed for the first communication frequency band and the second communication frequency band, but need not be employed only for each of the first and second communication frequency bands, which is different from the first embodiment. This high frequency front-end unit is arranged by the antenna, the duplexer, the low noise amplifier, the RX band-pass filter, the power amplifier, and the TX band-pass filter.

Since any of these first and second communication frequency bands corresponds to the 800 MHz band, a first frequency converting system of this multi-band radio terminal apparatus is realized as follows. In such a case that this radio terminal apparatus is operated in the first communication frequency band, and also in the second communication frequency band, the same means may function, and further both a first voltage-controlled oscillator 15 and a first phase-locked loop 16 constitute a first local oscillator so as to output a first local oscillator signal.

Similar to the first embodiment, while a frequency of a reception intermediate frequency signal is selected to be 210.38 MHz, when the multi-band radio terminal apparatus of the third embodiment is operated in the first communication frequency band, since a reception frequency band is equal to 869.01 MHz through 894 MHz, an oscillator frequency of the first local oscillator (arranged by first voltage-controlled oscillator 15 and first phase-locked loop 16) is selected to be 658.63 MHz through 683.62 MHz. Also, when this multi-band radio terminal apparatus is operated in the second communication frequency band, since a reception frequency band is equal to 832 MHz through 870 MHz, an oscillator frequency of the first local oscillator (arranged by first voltage-controlled oscillator 15 and first phase-locked loop 16) is selected to be 621.62 MHz to 659.62 MHz. Although any one of an upper side wave and a lower side wave may be selected as the first local oscillator signal, the lower side wave is employed in this third embodiment.

As a consequence, the first local oscillator (constituted by first voltage-controlled oscillator 15 and first phase-locked loop 16) may cover such an oscillating frequency range defined between 621.62 MHz and 683.62 MHz.

Also, since a transmission frequency band of the first communication band corresponds to 824.01 MHz to 849 MHz and a transmission frequency band of the second communication band corresponds to 887 MHz to 925 MHz, when the first local oscillator is commonly used in the RX side and the TX side, a frequency of a transmission intermediate frequency signal is equal to 165.38 MHz in the case that this multi-band radio terminal apparatus is operated in the first communication frequency band, and further is equal to 265.38 MHz in the case that this multi-band radio terminal apparatus is operated in the second communication frequency band.

A structure of the second frequency converting system on the signal reception (RX) side is similar to that of the first embodiment. A structure of the second frequency converting system on the signal transmission (TX) side is given as follows. There is a large separation between the required second local oscillator frequencies, respectively, when the multi-band radio terminal apparatus is operated in the first communication frequency band, and also in the second communication frequency band. Accordingly, two sets of second TX local oscillators are provided, namely a first TX second local oscillator 47 and a second TX second local oscillator 48. When the multi-band radio terminal apparatus is operated in the first communication frequency band, the first TX second local oscillator 47 produces a local oscillator signal (165.38 MHz). When the multi-band radio terminal apparatus is operated in the second communication frequency band, the second TX second local oscillator 48 produces a local oscillator signal (265.38 MHz). These local oscillator signals are selectively switched by a second local oscillator switch 49 to be supplied to the TX second frequency mixer 41 for the 4-phase modulating operation.

Also, in this third embodiment, a TX intermediate frequency blocking filter 39 is applied to the multi-band radio terminal apparatus. While the blocking frequency band of this filter 39 is set to the reception intermediate frequency band (210.38 MHz), such signals within the transmission intermediate frequency band (165.38 MHz and 265.38 MHz) may pass through this filter 39.

In this third embodiment, since the frequency of the first communication frequency band approximates to the frequency of the second communication frequency band, the high frequency front-end unit may be commonly employed for the first communication frequency band and the second communication frequency band, but need not be employed only for each of the first and second communication frequency bands. This high frequency front-end unit is arranged by the antenna, the duplexer, the low noise amplifier, the RX band-pass filter, the power amplifier, and the TX band-pass filter.

Since any of these first and second communication frequency bands is equal to the 800 Mhz band, the first frequency converting system of this multi-band radio terminal apparatus can directly use the local oscillator signal of the local oscillator arranged by the first voltage-controlled oscillator 15 and the phase-locked loop 16. As a result, the arrangement of the first frequency converting system can be made simple.

Also, since this local oscillator frequency is different from the communication signal frequency, there is no such a risk that the local oscillating operation is brought into unstable condition due to mutual interference.

As previously described, the various embodiments of the CDMA type multi-band radio terminal apparatus have been described. However, the present invention is not limited to the above embodiments, but may be apparently applied to other types of communication systems. Also, the above-explained structural means of the multi-band radio terminal apparatus are not limitedly described in the respective embodiments. Alternatively, other structural means may be employed.

What is claimed is:

1. A multi-band radio terminal apparatus comprising:
   a transmitter/receiver for processing radio communication signals of a plurality of communication frequency bands which include a first communication frequency band and a second communication frequency band, said radio communication signals being used to communicate with a base station; and
   a frequency converter for frequency-converting between said communication frequency bands of said radio communication signals and low frequency bands which are lower than said communication frequency bands,
   wherein said frequency converter includes:
   a reception-sided mixer for converting a plurality of reception signals within the communication frequency bands into another reception signal within one of said low frequency bands,
   a transmission-sided mixer for converting a transmission signal within one of said low frequency bands into another transmission signal within a corresponding communication frequency band, and
   a local oscillator for commonly supplying a local oscillator signal to both said reception-sided mixer and said transmission-sided mixer,
   wherein said local oscillator includes an oscillator and a switch and a frequency doubling or dividing circuit for selectively supplying a frequency of an oscillator output and a frequency obtained by doubling or dividing said oscillator output in response to the communication frequency band of the radio communication signal used in the communication between the base station and the multi-band radio terminal apparatus.

2. A multi-band radio terminal apparatus comprising:
   a transmitter/receiver for processing radio communication signals of a plurality of communication frequency bands which include a first communication frequency band and a second communication frequency band, said radio communication signals being used to communicate with a base station; and a frequency converter for frequency-converting between said communication frequency bands of said radio communication signals and low frequency bands which are lower than said communication frequency bands, wherein said frequency converter includes:

a reception-sided mixer for converting a plurality of reception signals within the communication frequency bands into another reception signal within one of said low frequency bands, wherein said reception-sided mixer is commonly used for said first and second communication frequency bands by using a common low frequency signal for said first and second communication frequency bands, a transmission-sided mixer for converting a transmission signal within one of said low frequency bands into another transmission signal within a corresponding communication frequency band, and a local oscillator for commonly supplying a local oscillator signal to both said reception-sided mixer and said transmission-sided mixer, wherein said local oscillator includes an oscillator and a switch and a frequency doubling or dividing circuit for selectively supplying a frequency of an oscillator output and a frequency obtained by doubling or dividing said oscillator output in response to the communication frequency band of a radio communication signal used in communication between the base station and the multi-band radio terminal apparatus.

3. A multi-band radio terminal apparatus comprising:

a transmitter/receiver for processing radio communication signals of a plurality of communication frequency bands which include a first communication frequency band and a second communication frequency band, said radio communication signals being used to communicate with a base station; and a frequency converter for frequency-converting between said communication frequency bands of said radio communication signals and low frequency bands which are lower than said communication frequency bands, wherein said frequency converter includes:

a reception-sided mixer for converting a plurality of reception signals within the communication frequency bands into another reception signal within one of said low frequency bands, wherein said reception-sided mixer is commonly used for said first and second communication frequency bands by using a common low frequency signal said first and second communication frequency bands, a transmission-sided mixer for converting a transmission signal within one of said low frequency bands into another transmission signal within a corresponding communication frequency band, and a local oscillator for commonly supplying a local oscillator signal to both said reception-sided mixer and said transmission-sided mixer, wherein said local oscillator includes an oscillator and a switch and a frequency doubling or dividing circuit for selectively supplying a frequency of an oscillator output and a frequency obtained by doubling or dividing said oscillator output in response to the communication frequency band of a radio communication signal used in communication between the base station and the multi-band radio terminal apparatus.

* * * * *